Nov. 21, 1961 G. L. EBBE ET AL 3,010,087

EQUALIZER

Filed Nov. 14, 1958

INVENTORS G. L. EBBE
R. V. SPERRY
BY
Ralph P. Holcomb
ATTORNEY

United States Patent Office 3,010,087

Patented Nov. 21, 1961

3,010,087
EQUALIZER

Grace L. Ebbe, Westfield, and Robert V. Sperry, New Providence, N.J., assignors to Bell Telephone Laboratories, Incorporated, New York, N.Y., a corporation of New York Filed Nov. 14, 1958, Ser. No. 773,872
1 Claim. (Cl. 333—28)

This invention relates to delay equalizers and more particularly to an adjustable, active equalizer using transistors.

The principal object of the invention is to correct delay distortion in a transmission path. A more specific object is to lower or eliminate the insertion loss in an equalizer used for this purpose.

In high-quality systems such as are used for television or data transmission, the delay distortion must be carefully corrected. Preferably, the delay characteristic should be adjustable continuously or in small steps, and independently of the loss characteristic. The loss associated with the delay correction should be zero, or at least small and flat over a wide frequency range. The insertion loss is quite high in passive equalizers, but may be reduced by including active elements in the circuit.

The delay equalizer of the present invention is of the active type and comprises a bridge circuit connected at two diagonally opposite corners to the output of a balanced amplifier. In the embodiment disclosed, this amplifier is of the differential type, with one input terminal grounded, and includes two emitter-coupled transistors. It constitutes a constant-current source for the bridge; that is, the output current of the amplifier is substantially constant for a wide range of the input impedance of the bridge. The amplifier may include an input stage adapted to raise the comparatively low impedance of the signal source to the high input impedance of the emitter-coupled transistors. The bridge includes a resistor in each arm and a series reactance in one arm. The network is adapted to work into a resistive load impedance of any finite value connected to the other corners of the bridge. The resistances of the bridge arms and the load are so related that the insertion loss of the bridge circuit is substantially constant with frequency over a wide band. This loss may be reduced to zero, or converted into a gain, by properly adjusting the gain of the amplifier. The delay characteristic depends upon the series reactance, which may be made up of resonant branches connected in parallel or antiresonant loops connected in series. The delay is adjusted by adjusting one or more of the component reactors or two of the bridge resistors.

The nature of the invention and its various objects, features, and advantages will appear more fully in the following detailed description of a typical embodiment illustrated in the accompanying drawing, of which FIG. 1 is a schematic circuit of an adjustable, active delay equalizer in accordance with the invention;

Figure 1:
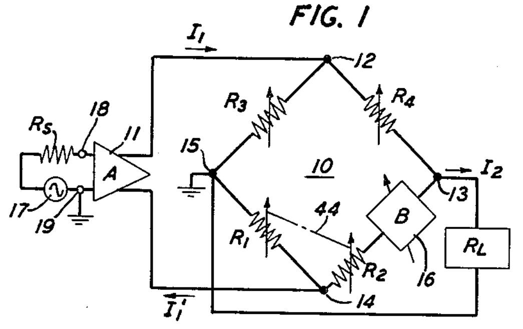

As shown in FIG. 1, the equalizer comprises a bridge circuit 10 and an amplifier 11. Three successive arms of the bridge 10 are constituted, respectively, by the resistors $R_1$, $R_3$, and $R_4$, and the fourth arm by the series combination of a resistor $R_2$ and a reactive impedance branch 16 having a susceptance B. The output of the amplifier 11 is connected to the opposite corners 12 and 14 of the bridge 10. A source 17 of signals to be equalized, of impedance $R_S$, is connected between the input terminals 18 and 19 of the amplifier 11. The terminal 19 is grounded. The load impedance, which is assumed to be purely resistive and may have any finite value $R_L$, is connected between the other corners 13 and 15 of the bridge 10. Either the corner 15 is grounded, as shown, or the corner 13. It is sometimes easier to allow for stray capacitances associated with the impedance 16 when the corner 13 is grounded.

Figure 2:
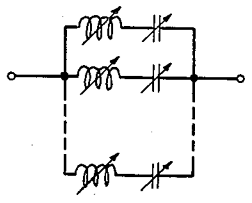
FIGS. 2 and 3 are schematic circuits of series reactances which are suitable for use in the bridge of FIG. 1.
Figure 3:
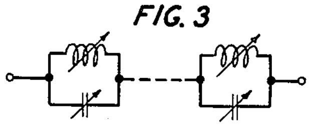

The impedance 16 is substantially a pure reactance and may be constituted by one or more reactors arranged in any suitable configuration. For example, it may be made up of series-resonant branches connected in parallel, as shown in FIG. 2, or parallel-resonant loops connected in series, as in FIG. 3. Some or all of these reactors may be made adjustable, as indicated by the arrows.

Figure 4:
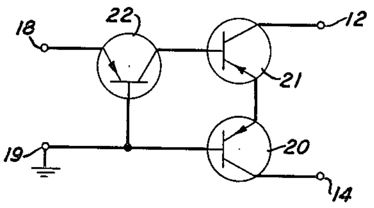
FIG. 4 is a diagram showing how the electrodes of the component transistors in the amplifier of FIG. 1 are connected to each other and to the terminals.

As shown in the skeletonized circuit of FIG. 4, the amplifier 11 comprises three transistors 20, 21, and 22. The transistors 20 and 21 have their emitters connected together and their collectors connected, respectively, to the output terminals 12 and 14 to constitute a differential amplifier and a constant-current source when fed through their bases. The transistor 22 is in the input stage, provided to match the usually low impedance $R_S$ of the signal source to the high impedance seen between the bases of the transistors 20 and 21. The emitter of the transistor 22 is connected to the input terminal 18, the collector to the base of the transistor 21, and the base to the grounded input terminal 19 and the base of the transistor 20.

Figure 5:
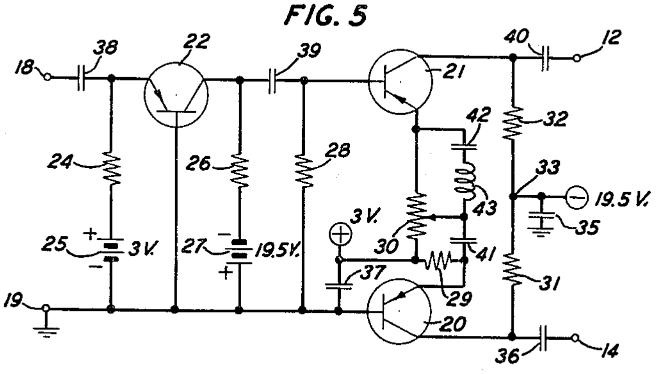
FIG. 5 is a schematic circuit showing the amplifier of FIGS. 1 and 4 in greater detail.

FIG. 5 is a more complete circuit of the amplifier 11. The input stage is of the common-base type with two-battery bias. The resistor 24 connects the positive terminal of the battery 25 to the emitter of the transistor 22 to furnish the emitter bias, and the resistor 26 connects the negative terminal of the battery 27 to the collector to supply the collector bias. The battery 25 may, for example, be three volts and the battery 27, 19.5 volts. The resistor 28, connected at one end to the positive terminal of the battery 27, provides a base bias for the transistor 21 to stabilize its operation. The transistors 20 and 21 have separate emitter bias resistors 29 and 30 connected to a three-volt battery, which may be the battery 25. The collectors of the transistors 20 and 21 are connected through the two collector-bias resistors 31 and 32. Their common terminal 33 is connected to the negative terminal of a 19.5-volt battery, which may be the battery 27, and to ground through a blocking capacitor 35. The resistors 31 and 32 are large compared to $R_1$, $R_3$, and $R_4$ and are approximately equal but are so adjusted that equal currents $I_1$ and $I_1'$ flow at the corners 12 and 14 of the bridge 10. As indicated by the arrows in FIG. 1, these corners are fed in phase opposition. In the present example, each of the resistors 31 and 32 has a value of approximately 8250 ohms. The capacitors 36, 37, 38, 39, 40, and 41, placed as required, are also included to confine the battery voltages to the proper branches of the network.

The transistor 21 operates essentially as a common-emitter circuit with feedback. The main feedback path is from ground through the base and the emitter of the transistor 20, the capacitor 41, and the upper portion of the resistor 30 to the emitter of the transistor 21. The gain of the amplifier is made more uniform, and the transmission band thus widened, by shunting a reactive impedance around this feedback resistance. As shown, this impedance comprises the series combination of a capacitor 42 and an inductor 43. This shunt has its greatest effect in reducing the gain at low frequencies and a gradually decreasing effect as the frequency is approached at which the capacitor and the inductor resonate. This resonant frequency is usually placed near the upper end of the band of interest.

Returning to FIG. 1, the ratio of the current $I_1$ entering the bridge 10 at the corner 12 to the output current $I_2$ may be expressed as $$\frac{I_1}{I_2}=(1+R_4/R_3+R_L/R_3)\frac{1+jB\left(R_1+R_2+R_L\frac{1+R_4/R_3}{1+R_4/R_3+R_L/R_3}\right)}{1-jB(R_1R_4/R_3-R_2)} \quad (1)$$

Since the susceptance B is the only factor which changes with frequency, this current ratio will have a constant modulus at all frequencies if the two coefficients of B are equal. Therefore, if $$2R_2+R_L\frac{1+R_4/R_3}{1+R_4/R_3+R_L/R_3}=R_1(R_4/R_3-1) \quad (2)$$

the modulus M will be constant and equal to $$M=1+R_4/R_3+R_L/R_3 \quad (3)$$

The phase shift $\beta$ introduced depends upon B and is given by $$\beta=2\tan^{-1}B\left(R_1+R_2+R_L\frac{1+R_4/R_3}{1+R_4/R_3+R_L/R_3}\right)$$
$$=2\tan^{-1}B(R_1R_4/R_3-R_2) \quad (4)$$

In order to maintain the insertion loss of the equalizer constant for all delay settings, the resistances $R_3$, $R_4$, and $R_L$ are generally fixed in value. The phase shift, and the associated delay characteristic, may be adjusted by adjusting $R_1$ and $R_2$, while retaining the required relationship between them given in Equation 2. As indicated by the dot-and-dash line 44, these resistors are preferably ganged for operation under a unitary control. The value of $R_2$ may be decreased by the effective series resistance associated with the impedance 16 to improve the uniformity of the loss.

From Equation 3 it is apparent that, in order to keep the flat loss of the equalizer low, the ratios $R_L/R_3$ and $R_4/R_3$ should both be kept as small as possible. The limiting ratio is the one which makes $R_2$ equal to zero.

Figure 6:
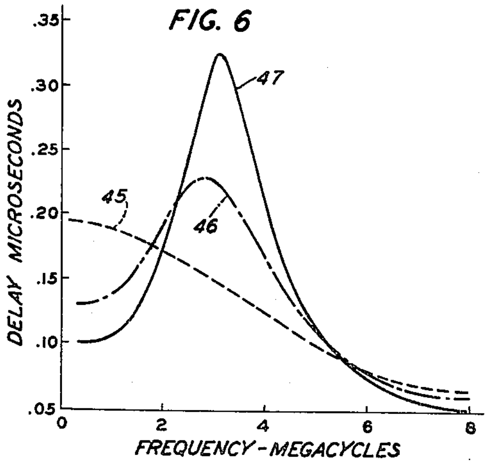
FIG. 6 is a plot of three typical delay-frequency characteristics obtainable with the equalizer of FIG. 1.

FIG. 6 shows three typical measured delay-frequency characteristics obtainable with the equalizer when the impedance branch 16 is constituted by an inductor of inductance L and a capacitor of capacitance C connected in series. The network is an all-pass structure with a phase shift of 360 degrees. The parameter $b$ is given by $$b=\frac{4\pi f_r L}{R_1R_4/R_3-R_2} \quad (5)$$

where $f_r$ is the frequency at which L and C resonate.

The curves 45, 46, and 47 correspond, respectively, to $b$'s of 1.26, 2.02, and 3.12. In each case, L is 1.2 microhenries and C is 123 micromicrofarads, making $f_r$ 3.4 megacycles. The load resistance $R_L$ is 75 ohms, $R_3$ is 314 ohms, and $R_4$ 942 ohms. The change in the characteristic is obtained by adjusting the values of $R_1$ and $R_2$. For the curve 45, $R_1$ is 147.0 ohms, and $R_2$ 112.0 ohms; for the curve 46, $R_1$ is 85.6 and $R_2$ 50.0 ohms, and for the curve 47, $R_1$ is 50.0 and $R_2$ 15.0 ohms. The insertion loss, in each case, is substantially flat from 0.1 to nine megacycles. By properly adjusting the feedback, this loss may be made zero, or a gain provided. This band width has been obtained with surface-barrier transistors. The band may be extended to 100 megacycles or more by using diffused-base transistors, which have a higher alpha cut-off.

The delay characteristic may be further adjusted if the reactors in the impedance branch 16 are made adjustable. Also, delay characteristics of other types may be provided by employing more reactors, as required.

If the relationship between $R_1$ and $R_2$ given by Equation 2 is not maintained, the loss will not be flat. If $R_2$ is made larger than its nominal value or $R_1$ smaller, a loss bump develops at $f_r$. Conversely, if $R_2$ is smaller or $R_2$ larger, a dip appears at $f_r$. If these deviations are small, the delay is only slightly changed.

It is to be understood that the above-described arrangement is only illustrative of the application of the principles of the invention. Numerous other arrangements may be devised by those skilled in the art without departing from the spirit and scope of the invention.

What is claimed is:

A delay equalizer comprising a balanced-to-ground source of signals having delay distortion, a four-arm bridge with two opposite corners connected thereto, and a resistive load of value $R_L$ connected to the remaining corners of the bridge, three successive arms of the bridge comprising, respectively, only resistors of value $R_1$, $R_3$, and $R_4$, the fourth arm comprising only the series combination of a resistor of value $R_2$ and a reactive impedance, and the values having approximately the following relationship:

$$2R_2+R_L\frac{1+R_4/R_3}{1+R_4/R_3+R_L/R_3}=R_1(R_4/R_3-1)$$

References Cited in the file of this patent

UNITED STATES PATENTS

| | | |
|---|---|---|
| 1,371,471 | Cohen | Mar. 15, 1921 |
| 2,002,192 | Rust | May 21, 1935 |
| 2,107,025 | Buchbeck et al. | Feb. 1, 1938 |
| 2,529,117 | Tompkins | Nov. 7, 1950 |
| 2,542,160 | Stoner | Feb. 20, 1951 |
| 2,589,184 | Zinn | Mar. 11, 1952 |
| 2,816,179 | Gittleman | Dec. 10, 1957 |
| 2,848,564 | Keonjian | Aug. 19, 1958 |
| 2,922,128 | Weinberg | Jan. 19, 1960 |